(No Model.)
A. S. ADLER.
MEASURING STRAP.
No. 533,520. Patented Feb. 5, 1895.
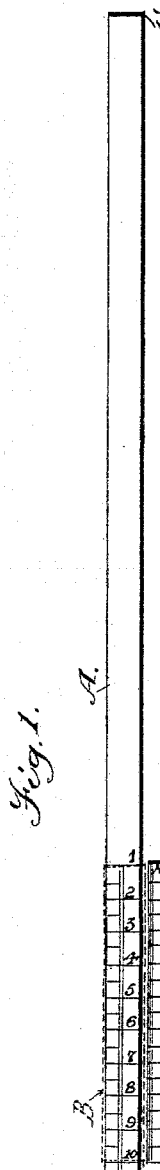
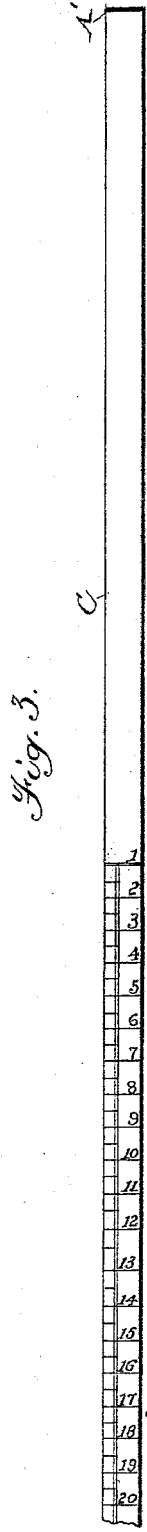
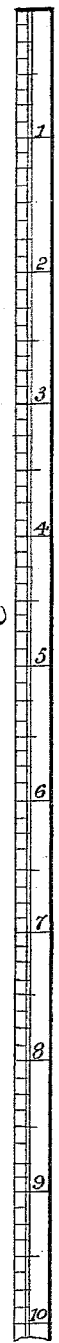
WITNESSES
Chapman Fowler
J. Edw. Fowler
INVENTOR
Abraham S. Adler,
by T. Walter Fowler,
his Attorney

UNITED STATES PATENT OFFICE.

ABRAHAM S. ADLER, OF BALTIMORE, MARYLAND.

MEASURING-STRAP.

SPECIFICATION forming part of Letters Patent No. 533,520, dated February 5, 1895.

Application filed March 22, 1894. Serial No. 504,696. (No model.)

*To all whom it may concern:*

Be it known that I, ABRAHAM S. ADLER, a citizen of the United States, residing at Baltimore, in the State of Maryland, have invented certain new and useful Improvements in Measuring Straps and Methods; and I do hereby declare the following to be a full, clear, and exact description of the invention, such as will enable others skilled in the art to which it appertains to make and use the same.

Figure 1, represents a measuring strap embodying my invention, showing the slide removed to one side. Fig. 2, is a view of the opposite side. Figs. 3 and 4, are views of opposite sides of a strap of modified form.

My invention relates to a method of and devices for measuring lasts to find out if they are of standard size, and my invention consists, essentially, of a method of ascertaining the width of a last by the difference between its longitudinal and circumferential measurements; and also of a strap or device graduated in size numbers and provided with a slidable section or member graduated by lines or characters which are adapted to be read in connection with the graduations on the strap to readily indicate if the several parts of the last to be measured are of standard size.

My invention also consists of a strap both of whose sides are graduated, one in size numbers and one in inches and fractions thereof, as I shall hereinafter fully describe and claim.

At present it is customary for last-makers to stamp, impress or otherwise mark upon lasts the size number and also the width. For example, a No. 3 last might be marked with a numeral 3 for indicating its length size, and a character C indicating its width, such a last being then recognized as a No. 3—C.

As lasts are affected by atmospheric changes they often shrink or expand, and as they may not be carefully made or turned it is often the case that such lasts are not of the standard size indicated by their characters. It being of the greatest importance that the lasts should be true, it is customary for the shoe makers to measure the length, the instep, the waist and the ball of the same, and to compare the obtained measurements with a scale of measurements recognized by the trade. These measurements are independent ones and in no case is it possible to know the width of the last without first measuring the bottom of the last at the ball to find this out. I have discovered, by a series of exhaustive experiments, that upon ascertaining the size in length of a last and then the circumference, say around the instep, that the difference in points between the two measurements will indicate the width measurement.

In carrying out my invention I take a strap A of any suitable construction and mark or otherwise form upon it a series of graduations. These graduations should commence at a point from one end of the strap which should correspond with the smallest size of last to be measured, say a ladies' No. 1, 3A, and they should, preferably, be in the usual circumferential sizes and half-sizes and numbered consecutively in whole numbers and half numbers from, say one to twenty or more, if desired. Mounted upon this strap is a slide B also graduated in lines and bearing letters, or numbers, indicating sizes in width, additional lines or characters being intermediate of the full lines for half numbers. Now, in using such a strap as I have indicated, I take a last, say one marked No. 3, C, as before alluded to, and then measure the same by a measuring machine or stick, to see if the length size is correct. If this part of the last is correct, I then move my slide B along the strap until its initial point A' registers with the character 3 indicating the size number of the last. Next I pass the strap around the instep and bring it together so that the character on the slide in alignment with the initial or starting point will disclose the width of the last.

As the waist measurement of a last of standard size should show one point less than the instep measurement, and the ball measurement should show two points less than the instep and one point less than the waist, the accuracy of the last at such points may be readily ascertained by passing the strap around the last at such points. If either of the measurements, at the waist or ball, shows in excess or less than the difference in points just mentioned, the operator will know at once that his last is not true and of standard size, and he will have to build it up or reduce it to make it conform to such standard.

Exactly the same results are obtained by the form of strap C shown in Figs. 3 and 4. In these figures I dispense with the slide of the former described strap but I graduate the strap in the same manner as said former strap. Having first ascertained the length size of the last, as previously mentioned, I pass this strap C around the instep portion of the last and bring the strap together. I then observe the character or graduation that is in line with the starting point of the strap, and then deduct the length size from such number which gives me the standard width without further difficulty.

The waist and ball measurements are taken by the strap C in the same manner and for the same purpose as those described for the strap A, as by deducting one point from the instep measurement for the waist and two points from the same for the ball will prove if the last is correct at such places. To make this more clear I would say that in the last No. 3—C, if the instep measurement shows 8 on the strap, the length size 3 deducted from 8 would leave 5, and as the size number commences at the last number or 3, the width would be D, or $2^A$, A, B, C, D, added to the smallest width $3^A$ or starting point in series of graduations. The opposite side of the straps A and C may also be graduated in inches and fractions thereof to ascertain the size of the last in inches, and also for assistance in laying out the work of cutting the upper, &c. Thus by first ascertaining the length size of a last and then the circumference, I am enabled to find the width by the difference in points between the two measurements.

The same method and devices may be used for measuring the human foot as well as the last without departing from the spirit of my invention.

Having thus described my invention, what I claim as new, and desire to secure by Letters Patent, is—

1. A measuring strap for testing lasts and their counterpart, formed of flexible material bendable in a plane at right angles to its width, and having its surface graduated in lines which commence at a point remote from its free end or starting point which denotes the circumferential measurement of a last or its counterpart of minimum size, and a slide of flexible material mounted on said strap and having its face graduated and provided with characters representing the width numbers of lasts or their counterpart.

2. A strap formed of flexible material bendable in a direction at right angles to its width, and a slide mounted on said strap and formed of flexible material, said strap and slide each having its face graduated with independent and different scales adapted to be read together, substantially as herein described.

In testimony whereof I affix my signature in presence of two witnesses.

ABRAHAM S. ADLER.

Witnesses:
S. A. TERRY,
T. WALTER FOWLER.